United States Patent
Asanuma et al.

(10) Patent No.: US 8,023,900 B2
(45) Date of Patent: Sep. 20, 2011

(54) MOBILE RADIO TERMINAL AND MOBILE COMMUNICATION SYSTEM

(75) Inventors: Yutaka Asanuma, Tokyo (JP); Shigeo Terabe, Hachioji (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 736 days.

(21) Appl. No.: 12/166,390

(22) Filed: Jul. 2, 2008

(65) Prior Publication Data

US 2009/0170442 A1    Jul. 2, 2009

(30) Foreign Application Priority Data

Dec. 27, 2007   (JP) .................................. 2007-338220

(51) Int. Cl.
*H04B 17/00*    (2006.01)
(52) U.S. Cl. ............... 455/67.11; 455/67.13; 455/226.1; 455/115.1; 375/316
(58) Field of Classification Search ............... 455/67.11, 455/115.1, 226.1, 67.13, 452.2, 277.2, 553.1, 455/509; 375/316, 260; 370/130, 333
See application file for complete search history.

(56) References Cited

U.S. PATENT DOCUMENTS

| | | | | |
|---|---|---|---|---|
| 5,590,156 A * | 12/1996 | Carney | ........................ | 375/316 |
| 6,148,179 A * | 11/2000 | Wright et al. | ................ | 455/66.1 |
| 6,160,998 A * | 12/2000 | Wright et al. | ................ | 455/66.1 |
| 6,163,681 A * | 12/2000 | Wright et al. | ................ | 455/66.1 |
| 6,167,239 A * | 12/2000 | Wright et al. | ................ | 455/66.1 |
| 6,353,734 B1 * | 3/2002 | Wright et al. | ................... | 455/98 |
| 7,369,829 B2 * | 5/2008 | Lee et al. | ....................... | 455/255 |
| 7,495,515 B1 * | 2/2009 | Branch et al. | ................. | 330/305 |
| 2005/0037805 A1 * | 2/2005 | Lee et al. | .................... | 455/553.1 |
| 2008/0069060 A1 * | 3/2008 | Das et al. | ....................... | 370/337 |
| 2008/0285488 A1 * | 11/2008 | Walton et al. | ................. | 370/280 |
| 2009/0116570 A1 * | 5/2009 | Bala et al. | ..................... | 375/260 |
| 2009/0163142 A1 * | 6/2009 | Pi et al. | ........................... | 455/62 |
| 2009/0180517 A1 * | 7/2009 | Lee et al. | ....................... | 375/130 |
| 2009/0270108 A1 * | 10/2009 | Xu | ............................ | 455/452.2 |
| 2009/0274224 A1 * | 11/2009 | Harris | .......................... | 375/260 |
| 2010/0105390 A1 * | 4/2010 | Ishii | .............................. | 455/436 |
| 2010/0113082 A1 * | 5/2010 | Ishii et al. | ..................... | 455/509 |
| 2010/0208606 A1 * | 8/2010 | Hoshino et al. | ............... | 370/252 |
| 2010/0311430 A1 * | 12/2010 | Katayama et al. | ............ | 455/450 |
| 2011/0009139 A1 * | 1/2011 | Nagata et al. | ................. | 455/509 |
| 2011/0038354 A1 * | 2/2011 | Akimoto et al. | .............. | 370/335 |
| 2011/0096691 A1 * | 4/2011 | Hoshino et al. | ............... | 370/252 |

OTHER PUBLICATIONS

3GPP TS 25.214 V5.110 (Jun. 2005) 6A HS-DSCH-related procedures.
3GPP TSG RAN WG1 #40bis R1-050249 Downlink Multiple Access Scheme for Evolved UTRA Multiplexing of Common Channel and Shared Data Channel, Apr. 4-8, 2005.
3GPP TSG RAN WG1 #51 R1-075064, Nov. 5-9, 2007.

* cited by examiner

*Primary Examiner* — Minh D Dao
(74) *Attorney, Agent, or Firm* — Maschoff Gilmore & Israelsen (57) ABSTRACT

Each of a mobile station and a base station stores a Wideband CQI table and a Subband CQI table. At the mobile station, a control unit transmits a CQI report value indicating Wideband CQI, and an index (Index S) indicating a differential value of a Diff reference value based on the CQI report value and Subband CQI, on the basis of the tables. In addition, the control unit makes the Diff reference value variable to prevent an expression amount of the index from being damaged if the Wideband CQI report value is in a range close to an upper lit or a lower limit of the Wideband CQI table.

26 Claims, 9 Drawing Sheets

Wideband CQI table

| Index W | CQI report value | Diff reference value |
|---|---|---|
| 0 | N/A | N/A |
| 1 | 1 | 4 |
| 2 | 2 | 4 |
| 3 | 3 | 4 |
| 4 | 4 | 4 |
| 5 | 5 | 5 |
| 6 | 6 | 6 |
| 7 | 7 | 7 |
| 8 | 8 | 8 |
| 9 | 9 | 9 |
| 10 | 10 | 10 |
| 11 | 11 | 11 |
| 12 | 12 | 12 |
| 13 | 13 | 13 |
| 14 | 14 | 14 |
| 15 | 15 | 15 |
| 16 | 16 | 16 |
| 17 | 17 | 17 |
| 18 | 18 | 18 |
| 19 | 19 | 19 |
| 20 | 20 | 20 |
| 21 | 21 | 21 |
| 22 | 22 | 22 |
| 23 | 23 | 23 |
| 24 | 24 | 24 |
| 25 | 25 | 25 |
| 26 | 26 | 26 |
| 27 | 27 | 26 |
| 28 | 28 | 26 |
| 29 | 29 | 26 |
| 30 | Reserved | Reserved |
| 31 | Reserved | Reserved |

Lower limit domain: indices 1–3
Standard domain: indices 4–26
Upper limit domain: indices 27–29

(b)

Subband CQI table

| Index S | Diff value |
|---|---|
| 0 | N/A |
| 1 | −3 |
| 2 | −2 |
| 3 | −1 |
| 4 | 0 |
| 5 | 1 |
| 6 | 2 |
| 7 | 3 |

FIG. 7

(a) Wideband CQI table

| Index W | CQI report value | Diff reference value |
|---|---|---|
| 0 | N/A | N/A |
| 1 | 1 | 4 |
| 2 | 2 | 4 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 26 |
| 27 | 27 | 26 |
| 28 | 28 | 26 |
| 29 | 29 | 26 |
| 30 | Reserved | Reserved |
| 31 | Reserved | Reserved |

Lower limit domain: indices 1–2
Standard domain: indices 3–25
Upper limit domain: indices 26–29

(b) Subband CQI table

| Index S | Diff value |
|---|---|
| 0 | N/A |
| 1 | -3 |
| 2 | -2 |
| 3 | -1 |
| 4 | 0 |
| 5 | 1 |
| 6 | 2 |
| 7 | 3 |

| | Wideband CQI table | |
|---|---|---|
| Index W | CQI report value | Diff reference value |
| 0 | N/A | N/A |
| 1 | 1 | 3 |
| 2 | 2 | 3 |
| 3 | 3 | 3 |
| 4 | 4 | 4 |
| 5 | 5 | 5 |
| 6 | 6 | 6 |
| 7 | 7 | 7 |
| 8 | 8 | 8 |
| 9 | 9 | 9 |
| 10 | 10 | 10 |
| 11 | 11 | 11 |
| 12 | 12 | 12 |
| 13 | 13 | 13 |
| 14 | 14 | 14 |
| 15 | 15 | 15 |
| 16 | 16 | 16 |
| 17 | 17 | 17 |
| 18 | 18 | 18 |
| 19 | 19 | 19 |
| 20 | 20 | 20 |
| 21 | 21 | 21 |
| 22 | 22 | 22 |
| 23 | 23 | 23 |
| 24 | 24 | 24 |
| 25 | 25 | 25 |
| 26 | 26 | 25 |
| 27 | 27 | 25 |
| 28 | 28 | 25 |
| 29 | 29 | 25 |
| 30 | Reserved | Reserved |
| 31 | Reserved | Reserved |

Lower limit domain: rows 1-2
Standard domain: rows 3-25
Upper limit domain: rows 26-29

(b)

| Subband CQI table | |
|---|---|
| Index S | Diff value |
| 0 | N/A |
| 1 | -2 |
| 2 | -1 |
| 3 | 0 |
| 4 | 1 |
| 5 | 2 |
| 6 | 3 |
| 7 | 4 |

FIG. 9

MOBILE RADIO TERMINAL AND MOBILE COMMUNICATION SYSTEM

CROSS-REFERENCE TO RELATED APPLICATIONS

This application is based upon and claims the benefit of priority from prior Japanese Patent Application No. 2007-338220, filed Dec. 27, 2007, the entire contents of which are incorporated herein by reference.

BACKGROUND OF THE INVENTION

1. Field of the Invention

The present invention relates to a mobile radio terminal capable of executing adaptive modulation.

2. Description of the Related Art

In a radio communication system employing the adaptive modulation, a terminal measures a radio transmission path quality and transmits it to a base station as CQI (Channel Quality Indication). The base station determines a transmission format (combination of the modulation and the encoding rate) on the basis of the CQI and transmits transmission information over an individual information channel using an appropriate transmission format. The type of the transmission format of the individual information channel is transmitted over the control channel as control information immediately before the transmission of the transmission information (cf., for example, 3GPP TS 25.214 V5.11.0 (2005-06) 6A HS-DSCH-related procedures).

In addition, in a system employing OFDM (Orthogonal Frequency Division Multiplexing), the base station executes transmission simultaneously using a number of sub-carriers. At this time, different terminals can be allocated to the respective sub-carriers. This system is similar to the conventional FDM system in terms of allocating specific frequencies, but greatly different in terms of a feature that each terminal simultaneously receives all the sub-carriers of OFDM, executes a receiving process of the OFDM signal and extracts the sub-carrier to be received (cf., for example, 3GPP TSG RAN1#40bis R1-050249 Downlink Multiple Access Scheme for Evolved UTRA Multiplexing of Common Channel and Shared Data Channel). In this document, the sub-carriers are allocated to the terminals by a unit of grouping.

If the above two conventional techniques are combined, a radio communication system employing the following frequency band allocation control and the applied control of modulation and encoding can be constituted.

In a system of simultaneously receiving a plurality of bands such as the OFDM system, the terminal measures a radio transmission path quality or reception quality of sub-bands determined by dividing the entire measured band, and transmits the measurement result to the base station as CQI information.

The base station selects the transmission format to be applied to the individual information channel on which the transmission information is transmitted, and a sub-carrier group (RB: Resource Block) to be used, on the basis of the CQI information transmitted from each of the terminals and the other information saved in the base station. The information of the transmission format applied to the individual information channel and the information of the RB to be used are transmitted to the terminal before the individual information channel is transmitted over the control channel.

In other words, the CQI of each sub-group is transmitted from the terminal, and the information of the transmission format of the individual information channel and the information of the RB to be used are transmitted over the control channel from the base station.

For this reason, the terminal receives all the control channels, detects the control channel on which its own terminal ID is recorded, discriminates the RB to be used over the individual information channel, on the basis of the information on the detected control channel, discriminates the applied transmission format and sets the receiving function, and receives the individual information channel transmitted from the base station.

Incidentally, in some systems, the terminal transmits a Wideband quality measurement value (hereinafter called Wideband CQI) and a quality measurement value (hereinafter called Subband CQI) of Subbands obtained by dividing the Wideband, as the CQI information to be transmitted to the base station (cf., for example, 3GPP TSG RAN1#51 R1-075064).

In such a system, the Wideband CQI is notified as the CQI information, by a CQI report value representing its quality at, for example, 32 stages while the Subband CQI is notified as the CQI information, by a Diff value representing a differential value of, for example, 8 stages about the CQI report value of the Wideband including the Subband.

As for the CQI information of this system, however, if the CQI report value is close to the upper limit or lower limit, the represented range of the Subband CQI based on the Diff value is made narrow and the bit sequence required for the transmission of the Diff value cannot be efficiently used.

BRIEF SUMMARY OF THE INVENTION

The present invention has been accomplished to solve the above-described problems. The object of the present invention is to provide a mobile radio terminal and mobile communication system, capable of effectively using the bit string required for the transmission of the Diff value even if the CQI report value indicating the Wideband CQI is a value close to the upper limit or lower limit.

To achieve this object, the present invention is a mobile radio terminal establishing radio communications with a base station apparatus accommodated in a network. The mobile radio terminal comprises: a Wideband measuring unit which measures reception quality of a Wideband; a Subband measuring unit which measures reception quality of each of a plurality of Subbands included in the Wideband; a first determining unit which determines a Wideband report value within a preset first range, in accordance with the measurement result of the Wideband measuring unit; a second determining unit which determines a reference value having a preset first referential difference from the Wideband report value, and which determines a reference value having a second referential difference smaller than the first referential difference if the Wideband report value is a value in a preset upper limit domain; a third determining unit which determines an index value corresponding to a difference between the referential value and the Subband reception quality, within a preset second range; and a transmitting unit which transmits the Wideband report value and the index value to the base station apparatus.

According to the present invention, if the Wideband reception quality is a value of the preset upper limit domain upon reporting the Subband reception quality to the base station, the reference value used to obtain the index value indicating the difference from the Subband reception quality is set to be a value having the second referential difference smaller than the general first referential difference.

Therefore, the present invention can provide the mobile radio terminal and mobile communication system, which can maintain an effective range represented within the second range since the reference value is set to be small relatively in a case where the Wideband reception quality is a value of the preset upper limit domain, i.e., which can effectively use the bit string required for the transmission of the Diff value even if the CQI report value indicating the Wideband CQI is a value close to the upper limit (or the lower limit).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be explained below with reference to the accompanying drawings. In the following descriptions, the present invention is applied to a cellular system as a mobile communication system.

Figure 1:
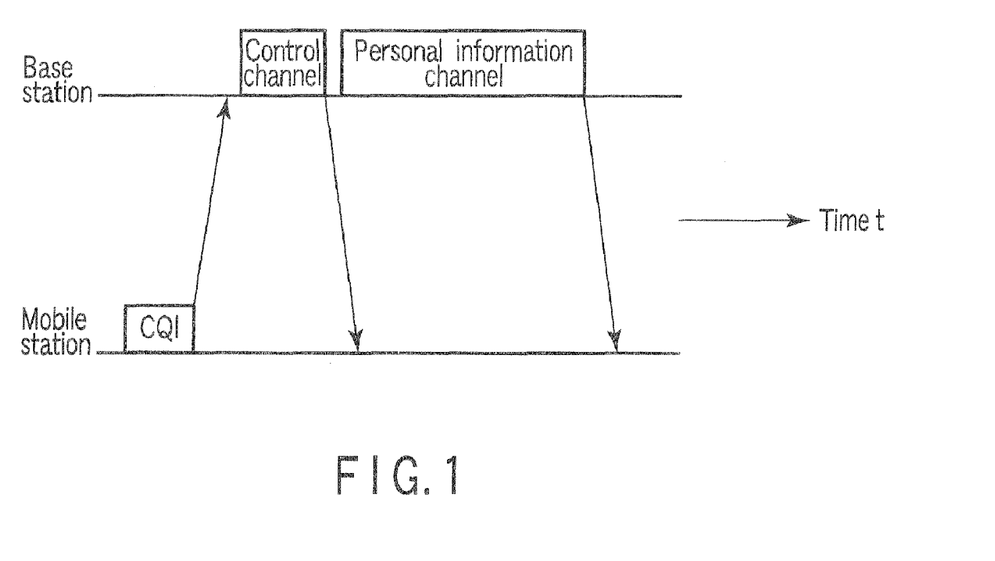
FIG. 1 shows an illustration of a concept of an adaptive control of a mobile communication system according to the present invention.

In the cellular system, a plurality of terminals (hereinafter called mobile stations) are connected simultaneously to a single base station. As shown in FIG. 1, a transmission path quality is measured for each of Subbands and transmitted as CQI at each of the mobile stations. Various methods are conceived as the type of CQI. For simple explanation, a transmission format (combination of the modulation and the coding rate) which is obtained from the transmission path quality and which can be received for each of Subbands is employed here. MCS number (Index) is allocated to each transmission format (combination of the modulation and the coding rate), and is transmitted to each of the Subbands at the CQI. Modulated multiple values are 2 in QPSK, 4 in 16QAM and 6 in 64QAM, and the coding rate is (number of information bit/number of coded bit). By transmitting the CQI which has a number of modulated multiple values and makes the coding rate higher and the transmission rate higher to the RB corresponding to the Subband of a good transmission path quality, the base station is notified a matter that it is possible to transmit much information in the same band at a high transmission rate.

On the other hand, the base station determines RB to be used and a transmission format (MCS: Modulation Coding set) to be used for transmission of the information to each of the mobile stations, on the basis of the CQI information transmitted from each of the mobile stations and the other information that the base station has, for example, the amount of the information to be transmitted, the possible transmission power, the previous band allocation and the like. Then, the base station transmits the transmission format determined on the basis of the CQI over the control channel as the control information immediately before transmitting eh transmission information over the individual information channel. In other words, when the base station selects and determines a combination pf the RB and the mobile station notifying the CQI having more modulated multiple numbers, higher coding rate and higher transmission rate, the mobile station can transmit much information.

Figure 2:
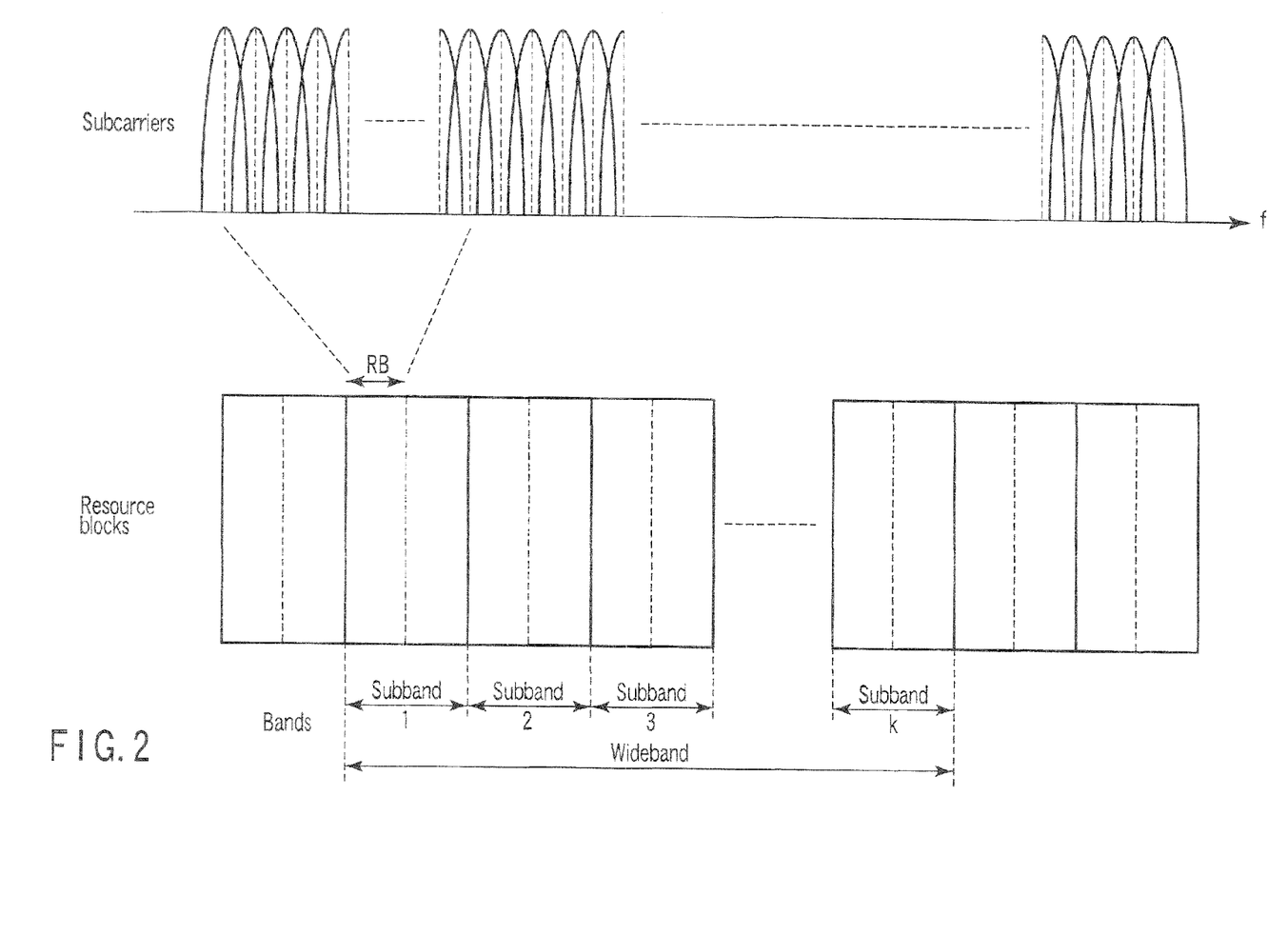
FIG. 2 shows a relationship between a Wideband and a Subband in the mobile communication system according to the present invention.

In addition, in the system according to the present invention, for example, a Subband consists of a pair of resource blocks and number k of Subbands are called Wideband as the resource block (RB) unit of a plurality of subcarriers, as shown in FIG. 2. Each of the mobile stations measures Wideband quality Wideband CQI and quality Subband CQI of a plurality of Subbands included in the Wideband.

As for the Wideband CQI considered as a measured value of the Wideband, each of the mobile stations notifies the base station of CQI report values which indicate the quality of the Wideband CQI at, for example, 32 steps, by index (Index W). As for the Subband CQI, each of the mobile stations notifies the base station of differential values (Diff values) of, for example, 8 steps based on the CQI report values of the Wideband including the Subband, by index (Index W). In the present invention, the basis is variable in accordance with the CQI report values of the Wideband as described later.

Figure 3:
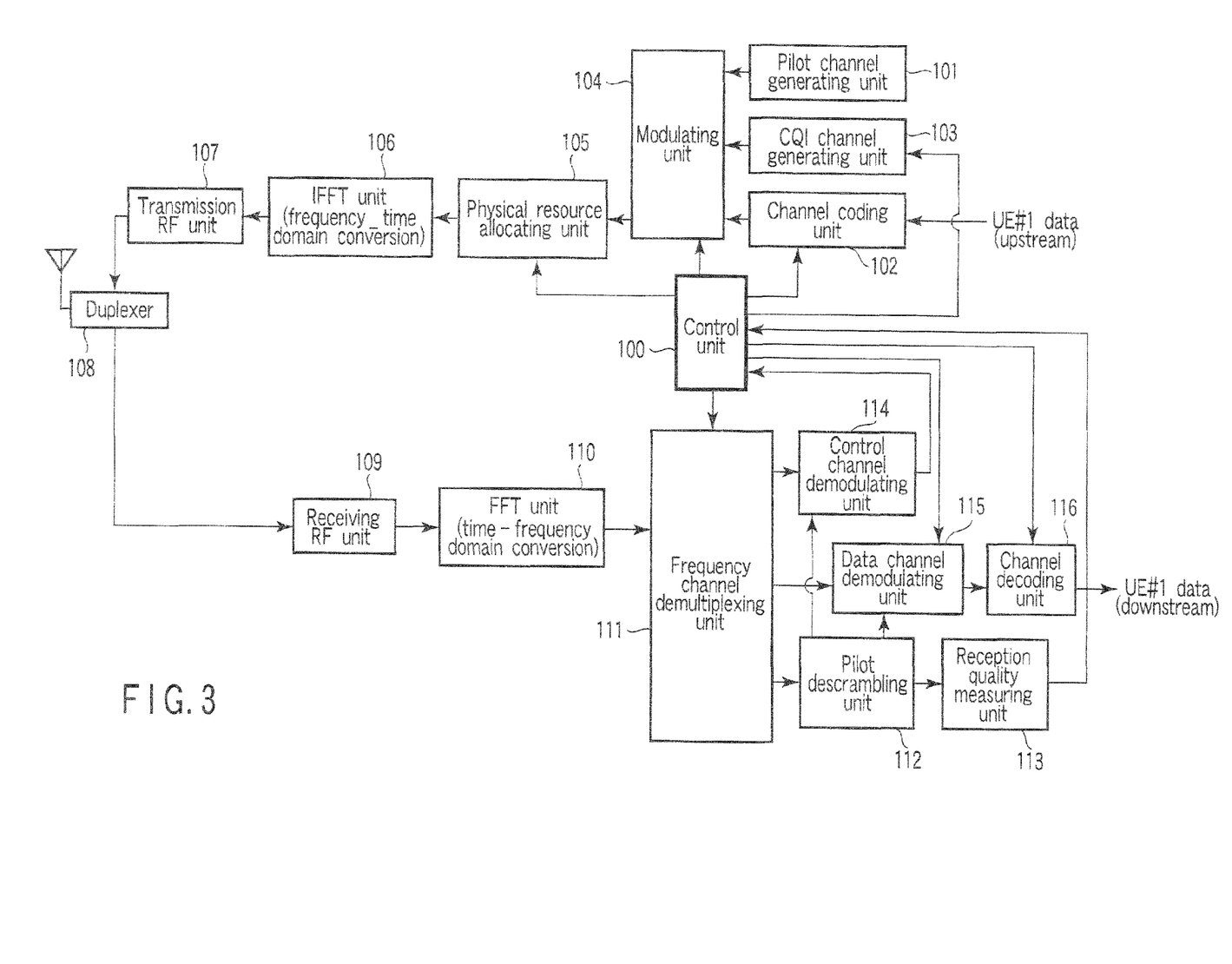
FIG. 3 shows a block diagram of a configuration of a mobile station in the mobile communication system according to an embodiment of the present invention.

FIG. 3 shows a configuration of the mobile station in the radio communication system according to the embodiment of the present invention.

A pilot channel generating unit 101 generates a bit string which is to be a pilot signal transmitted over a pilot channel, multiplies the bit string by a scrambling code and outputs the bit string to a modulating unit 104. A CQI channel generating unit 103 generates a bit string of the CQI information notified by a control unit 100 and outputs the bit string to the modulating unit 104. The CQI channel generating unit 103 can also process the CQI information by channel coding. A channel coding unit 102 processes an upstream transmission data bit string by channel coding, at a channel coding rate directed by the control unit 100 and outputs the upstream transmission data bit string to the modulating unit 104.

The modulating unit 104 processes the bit strings which are to be the pilot signal, the CQI information and the channel-coded upstream transmission data signal by digital modulation such as quadrature phase shift keying (QPSK) in the modulation system directed by the control unit 100, and thereby obtains a pilot signal, a CQI signal and a transmission data signal.

The generated pilot signal and transmission data signal are allocated to subcarriers directed by the control unit 100, by a physical resource allocating unit 105. "To allocate the signals to the subcarriers" means to allocate positions in time axis and frequency axis, of the subcarriers in the corresponding resource blocks, to the signals represented as complex numbers.

An inverse fast Fourier transform (IFFT) unit 106 converts the signals of a frequency domain output from the physical resource allocating unit 105 into signals of a time domain, urges a transmission RF unit 107 comprising a digital-to-analog converter, an up-converter, a power amplifier and the like to convert the signals of time domain into radio (RF) signals, and emits the radio (RF) signals into space, for the base station, via a duplexer 108 and an antenna.

The radio signal transmitted from the base station is received by the antenna and output to a receiving RF unit 109 via the duplexer 108. The received radio signal is converted into a baseband digital signal by the receiving RF unit 109 comprising a down-converter, an analog-digital converter and the like.

A fast Fourier transform (FFT) unit 110 processes the baseband digital signal by fast Fourier transform (FFT). The signal of time domain is thereby divided into signals of frequency domain, i.e. signals for respective subcarriers. The signals thus divided for the respective subcarriers are output to a frequency channel demultiplexing unit 111.

The frequency channel demultiplexing unit 111 demultiplexes the signals divided for the respective subcarriers into the pilot signal, the control channel signal and the data signal, under a direction from the control unit 100.

The pilot signal is descrambled in a descrambling pattern inverse to a scrambling pattern used at the base station transmitting the signal which is to be received by the mobile stations, by a pilot descrambling unit 112. The descrambling result is output to a control channel demodulating unit 114, a data channel demodulating unit 115 and a reception quality measuring unit 113. The reception quality measuring unit 113 measures the reception quality for each Subband (Subband CQI) and the reception quality for each Wideband (Wideband CQI), on the basis of the pilot signal, and measures the channel variation amount. These measurement results are output to the control unit 100.

Each of the Wideband CQI and the Subband CQI is represented at 32 steps from 0 to 31, and is associated with the reception quality. A method of association is a combination of the modulation and the coding rate, the transmission bit number for each Resource Block, equivalent SNR (equivalent SINR) or the like. 0 represents the low quality and 31 represents the high quality. When the CQI is associated as the combination of the modulation and the coding rate, 0 is expressed as if it were (QPSK, R=$\frac{1}{12}$), 1 is expressed as if it were (QPSK, R=$\frac{1}{9}$), . . . , 30 is expressed as if it were (16QAM, R=$\frac{2}{3}$), 31 is expressed as if it were (QPSK, R=$\frac{4}{5}$). When the CQI is associated as the transmission bit number for each Resource Block, 0 is expressed as if it were 16 bits, 1 is expressed as if it were 20 bits, . . . , 30 is expressed as if it were 16384 bits, 31 is expressed as if it were 22528 bits. When the CQI is associated as the equivalent SNR (equivalent SINR), 0 is expressed as if it were −11 dB, 1 is expressed as if it were −10 dB, . . . , 30 is expressed as if it were 19 dB, 31 is expressed as if it were 20 dB.

The control channel demodulating unit 114 processes the control channel signal output from the frequency channel demultiplexing unit 111, by channel equivalence using the pilot signal descrambled by the pilot descrambling unit 112, and then demodulates the control channel signal. The control channel bit sequence thus demodulated is output to the control unit 100.

The control unit 100 controls all the units of the mobile station. The control unit 100 discriminates whether or not the received signal is a signal transmitted for the mobile station, for each sub-frame, on the basis of the information included in the control channel. If the control unit 100 discriminates that the received signal is a signal transmitted for the mobile station, the control unit 100 extracts the signaling information included in the received signal, and detects the information necessary for demodulation of the data channel signal and the information necessary for decoding of the data channel signal, in the extracted signaling information.

The information necessary for demodulation of the data channel signal is output to the data channel demodulating unit 115, and the information necessary for decoding of the data channel signal is output to the channel decoding unit 116. If the control unit 100 discriminates that the received signal is not a signal transmitted for the mobile station, demodulation or decoding of the data channel signal is stopped.

The data channel demodulating unit 115 processes each of the signals output from the frequency channel demultiplexing unit 111, by channel equivalence using the pilot signal output from the pilot descrambling unit 112, and demodulates the signal in the demodulation method directed by the control unit 100, on the basis of the information output from the control unit 100. The data bit string thus demodulated is decoded by the channel decoding unit 116, and a downstream data bit string transmitted for the mobile station is obtained. The information output from the control unit 100 is used for the decoding.

Figure 4:
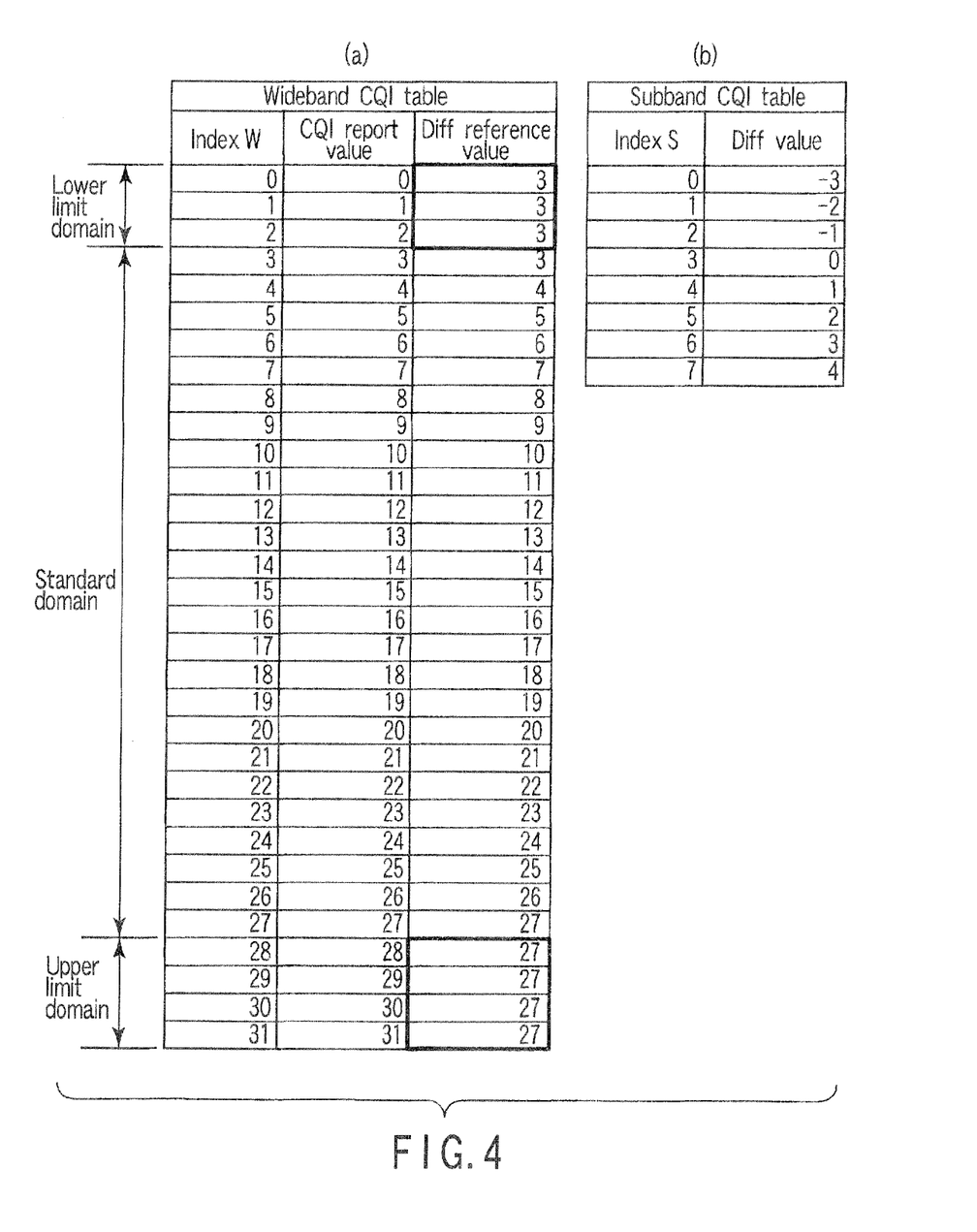
FIG. 4 shows CQI tables used in the mobile communication system according to the present invention.

To execute the adaptive modulation control in the communications with the base station, the control unit 100 stores, for example, a Wideband CQI table as shown in FIG. 4(*a*) and a Subband CQI table as shown in FIG. 4(*b*), and generates the CQI information (Index W corresponding to the Wideband CQI report value and the Diff reference value, Index S corresponding to the Diff value) on the basis of the information recorded on these tables, and the Wideband and Subband reception quality (Wideband CQI and Subband CQI) measured by the reception quality measuring unit 113. More specifically, the Wideband CQI table associates the Index W transmitted to the base station, Wideband reception quality Wideband CQI report value measured by the reception quality measuring unit 113, and the Diff reference value. On the Wideband CQI table, the same values of the CQI report value and the Diff reference value represented as the Index W are associated in the standard region. In other words, the difference between the CQI report value and the Diff reference value (hereinafter called "referential difference") is constant (referential difference=0).

On the Wideband CQI table, however, the Diff reference value is associated with a smaller value than the CQI report value (i.e. referential difference<value satisfying 0; "27" in FIG. 4) in the vicinity of the upper limit (upper limit region) of the CQI report value while the Diff reference value is associated with a greater value than the CQI report value (i.e. referential difference>value satisfying 0; "3" in FIG. 4) in the vicinity of the lower limit (lower limit region) of the CQI report.

The Subband CQI table associates the Diff value indicating the difference between the Diff reference value and the Subband reception quality Subband CQI measured by the reception quality measuring unit 113 with an index (Index S) thereof.

When the control unit 100 receives the Wideband reception quality Wideband CQI from the reception quality measuring unit 113, the control unit 100 detects the Diff reference value and the CQI report value corresponding to the Index W associated therewith. If the Wideband CQI is out of the range represented by the Wideband CQI table, the control unit 100 selects the maximum or minimum CQI report value and Diff reference value in the range such that the Wideband CQI falls within the range.

Next, the control unit 100 detects preferable number j of Subband reception quality Subband CQI, of number k of Subband reception quality Subband CQI that are measured by the reception quality measuring unit 113. The control unit 100 obtains a difference (Diff value) between the Diff reference value and each of the number j of Subband reception quality Subband CQI, and detects the Index S corresponding thereto in the Subband CQI table. If the obtained Diff value is out of the range shown in each of the tables, the control unit 100 selects the maximum or minimum Index S in the range such that the obtained Diff value falls within the range.

Figure 5:
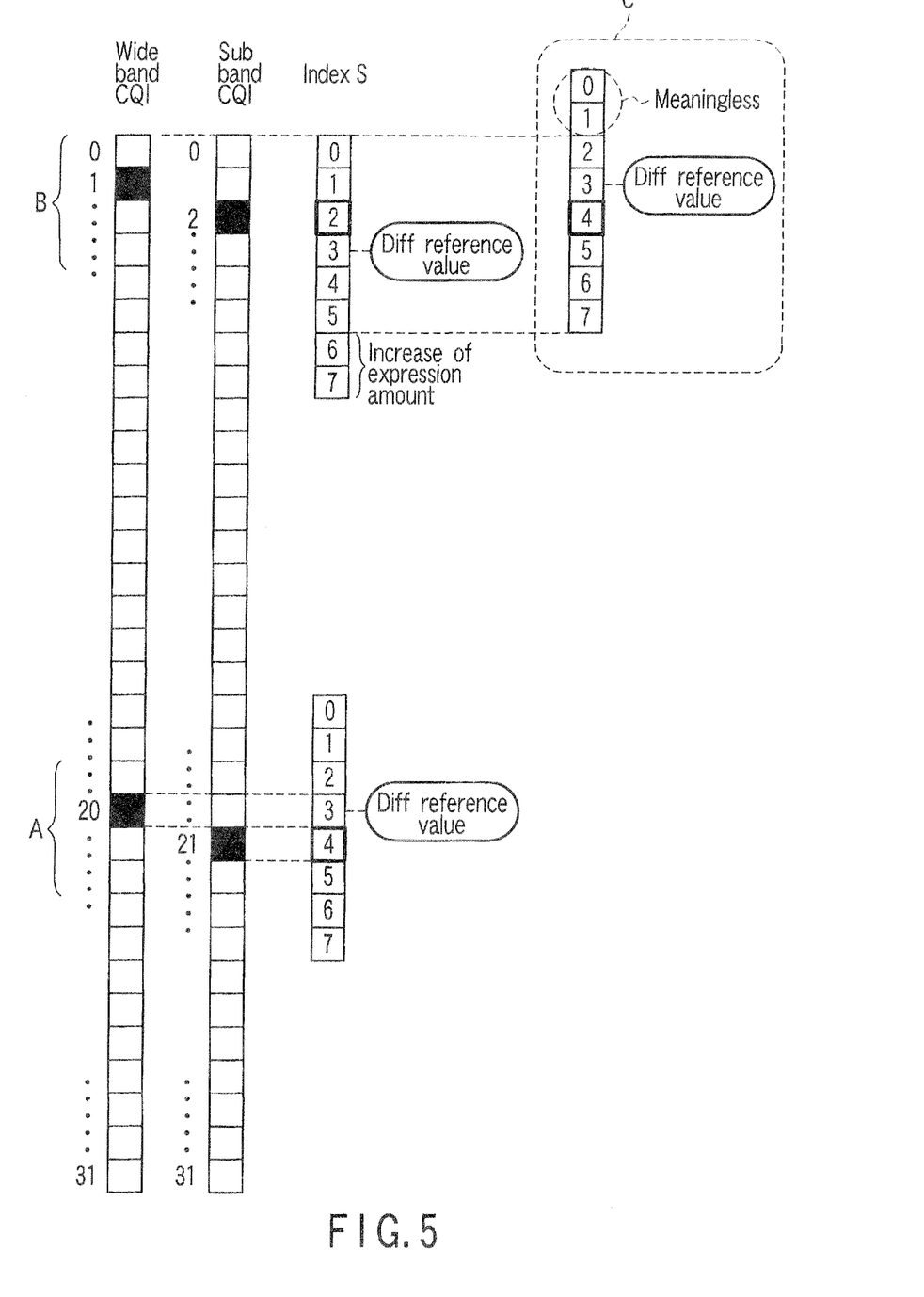
FIG. 5 shows an illustration of an operation of generating CQI information in the mobile communication system according to the present invention.

It is assumed here that Wideband CQI is "20" and the Subband CQI is "21", for example, as represented by A in FIG. 5. The control unit 100 detects "20" corresponding to Index 20 as the CQI report value and detects "20" corresponding to Index 20 as the Diff reference value. The control unit 100 detects Index S "4" (Index 4) equivalent to Diff value "1" as the difference between Diff reference value "20" and Subband CQI "21". As a result, the control unit 100 detects "20" as the Wideband CQI report value and detects Index 4 as the Subband differential value.

It is also assumed here that Wideband CQI is "1" and the Subband CQI is "2", for example, as represented by B in FIG. 5. The control unit 100 detects "1" corresponding to Index 1 as the CQI report value and detects "3" corresponding to Index 1 as the Diff reference value. The control unit 100 detects Index S "2" (Index 2) equivalent to Diff value "−1" as the difference between Diff reference value "3" and Subband CQI "2". As a result, the control unit 100 detects "1" as the Wideband CQI report value and detects Index 2 as the Subband differential value.

It is assumed here that "1" is set as the Diff reference value as it is, similarly to Index 1, as represented by C in FIG. 5. The setting is meaningless since no value corresponds to Index S "0" or "1". By shifting the Diff reference value by the control unit 100 as compared with this, the expression amount of the Subband CQI by the Index S is increased. The lower limit of the Wideband CQI table is explained, but the same advantage can also be obtained in relation to the upper limit.

The CQI report value obtained by the control unit 100 as described above and the Index S obtained in relation to each Subband are output to the CQI channel generating unit 103 as the CQI information. In response to this, the CQI channel generating unit 103 generates the bit string of the CQI information notified by the control unit 100, and outputs the bit string to the modulating unit 104.

In the example shown in FIG. 4 and FIG. 5, the quality of the Wideband CQI that is the measured value of Wideband is represented at 32 steps and the quality of the Subband CQI is represented as the differential value of 8 steps, i.e. Diff value. As for the CQI report value, a 5-bit bit string is generated by the CQI channel generating unit 103. As for the Diff value of each Subband, a 3-bit bit string is generated. Therefore, as for one Wideband and number j of Subbands, the CQI channel generating unit 103 generates the bit strings of number 5+3×j of bits on the CQI information.

Figure 6:
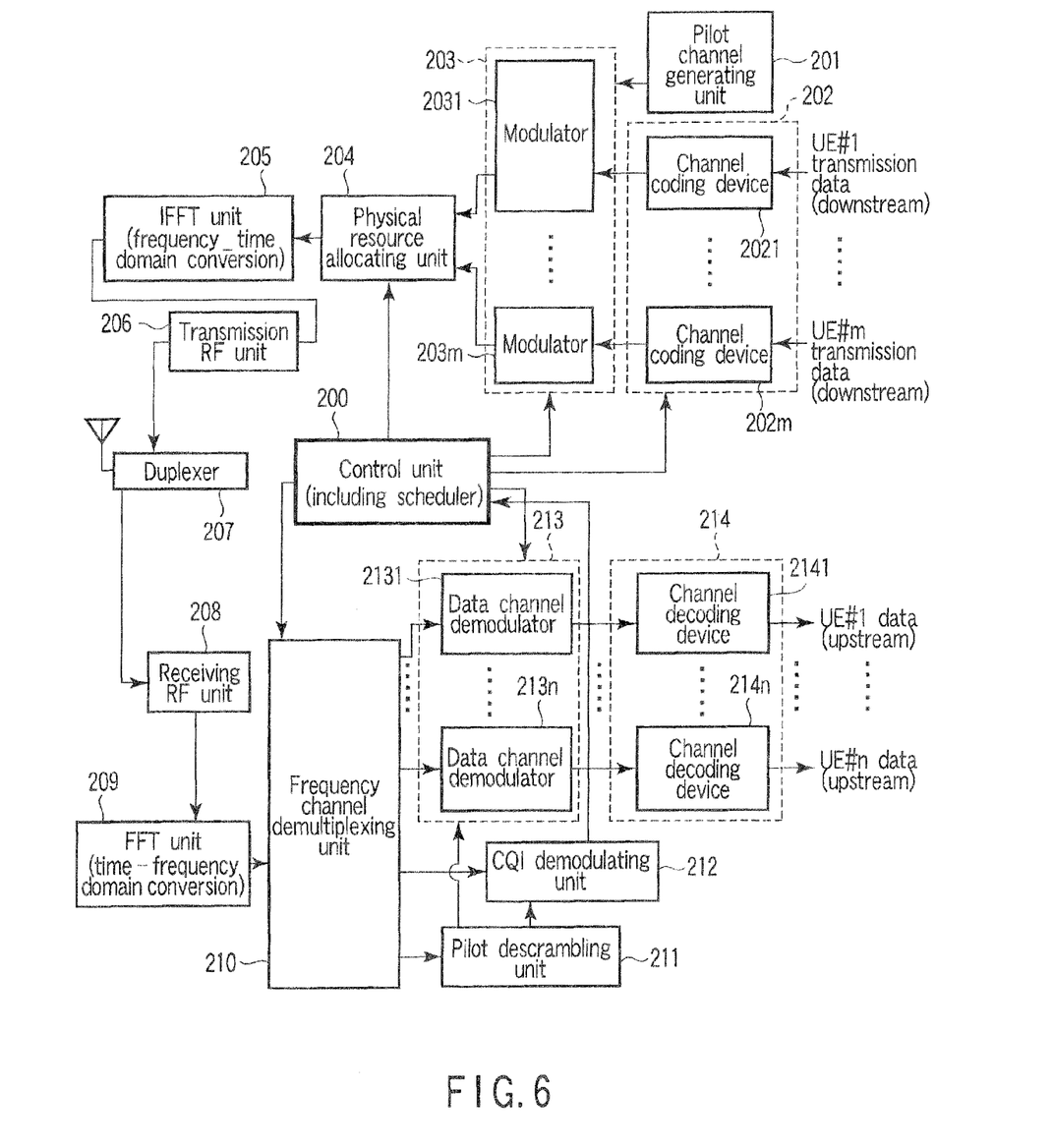
FIG. 6 shows a block diagram of a configuration of a base station in the mobile communication system according to the embodiment of the present invention.

FIG. 6 shows a configuration of the base station in the radio communication system according to the embodiment of the present invention.

A pilot channel generating unit 201 generates a bit string which is to be the pilot signal transmitted over the pilot channel, multiplies the bit string by the scrambling code, and outputs the bit string to a modulating unit 203. A channel coding unit 202 comprises channel coding devices 2021 to 202*m*. Each of the channel coding devices 2021 to 202*m* processes a downstream transmission data bit string by channel coding, at a channel coding rate directed by a control unit 200, and outputs the downstream transmission data bit string to the modulating unit 203.

The modulating unit 203 comprises modulators 2031 to 203*m* that correspond to the channel coding devices 2021 to 202*m*, respectively. Each of the modulators 2031 to 203*m* processes the bit strings which are to be the pilot signal and the channel-coded downstream transmission data signal, by digital modulation such as quadrature phase shift keying (QPSK) in the modulation system directed by the control unit 200, and generates a pilot signal and a transmission data signal.

The generated pilot signal and transmission data signal are allocated to sub-carriers directed by the control unit 200, by a physical resource allocating unit 204. "To allocate the signals to the subcarriers" means to allocate positions in time axis and frequency axis, of the subcarriers in the corresponding resource blocks, to the signals represented as complex numbers.

An inverse fast Fourier transform (IFFT) unit 205 converts the signals of a frequency domain output from the physical resource allocating unit 204 into signals of a time domain. The signals are converted by a transmission RF unit 206 comprising a digital-to-analog converter, an up-converter, a power amplifier and the like into radio (RF) signals, which are emitted into space, for the mobile stations, via a duplexer 207 and an antenna.

The radio signal transmitted from the mobile station is received by the antenna and output to a receiving RF unit 208 via the duplexer 207. The received radio signal is converted into a baseband digital signal by the receiving RF unit 208 comprising a down-converter, an analog-digital converter and the like.

A fast Fourier transform (FFT) unit 209 processes the baseband digital signal by fast Fourier transform (FFT). The signal of time domain is thereby divided into signals of frequency domain, i.e. signals for respective subcarriers. The signals thus divided for the respective subcarriers are output to a frequency channel demultiplexing unit 210.

The frequency channel demultiplexing unit 210 demultiplexes the signals divided for the respective subcarriers into the pilot signal, the control channel signal and the data signal, under a direction from the control unit 200.

The pilot signal is descrambled in a descrambling pattern inverse to a scrambling pattern used at the mobile station transmitting the signal which is to be received by the base station, by a pilot descrambling unit 211. The descrambling result is output to a CQI demodulating unit 212 and a data channel demodulating unit 213.

The CQI demodulating unit 212 processes the CQI channel signal output from the frequency channel demultiplexing unit 210, by channel equivalence using the pilot signal descrambled by the pilot descrambling unit 211, and then demodulates the CQI channel signal. The CQI channel signal thus demodulated is further channel-decoded by the CQI demodulating unit 212. The CQI information transmitted from the mobile stations is extracted from the CQI channel signal, and the CQI channel signal is output to the control unit 200.

The data channel demodulating unit 213 comprises a plurality of data channel demodulators 2131 to 213*n*. The data channel demodulators 2131 to 213*n* process the signals output from the frequency channel demultiplexing unit 210, by channel equivalence using the pilot signal output from the pilot descrambling unit 211, and demodulate the signals in the demodulating system directed by the control unit 200, on the basis of the information output from the control unit 200. The data bit strings thus demodulated are output to a channel decoding unit 214.

The channel decoding unit 214 comprises channel decoders 2141 to 214n that correspond to the data channel demodulators 2131 to 213n, respectively. The channel decoders 2141 to 214n decode the data bit strings demodulated by the data channel demodulators 2131 to 213n, and obtain the upstream data bit strings transmitted from the mobile stations. The information output from the control unit 200 is used for the decoding.

The control unit 200 controls all the units of the base station. The control unit 200 comprises a scheduler which determines to which mobile station the packet is transmitted for each frame, on the basis of the feedback information (CQI information and Ack/Nack of acknowledgment for received information) from the mobile stations, and the data amount and priority for each of the mobile stations. The control unit 200 urges the data for a plurality of mobile stations to be OFDM-multiplexed in the same frame, under a direction for the physical resource allocating unit 204.

In addition, the control unit 200 executes the adaptive modulation control for the mobile stations. Similarly to the control unit 100 of each mobile station, the control unit 200 stores, for example, the Wideband CQI table and the Subband CQI table as shown in FIG. 4, and restores the Wideband reception quality and Subband reception quality (Wideband CQI and Subband CQI) measured by the reception quality measuring unit 113 of the mobile station, on the basis of the information recorded on these tables, and the CQI information (CQI report value and Index S of Diff value) notified by the mobile station. On the basis of the reception quality, the control unit 200 determines a transmission format (combination of the modulation and the coding rate) of the individual information channel suitable for the mobile station.

It is assumed here that the control unit 200 is notified of "20" as the Wideband CQI report value and Index 4 as the Subband differential value, for example, as represented by A in FIG. 5. With reference to the Wideband CQI table, the control unit 200 detects that the Wideband CQI is Index 20 and that the Diff reference value is "20", since the CQI report value is "20". Then, the control unit 200 detects that the Subband CQI is "21" on the basis of the Subband CQI table and the Diff reference value "20", since the Subband differential value is Index 4. Thus, the control unit 200 detects Index 20 as the Wideband CQI and detects "21" as the Subband CQI.

It is also assumed here that the control unit 200 is notified of "1" as the Wideband CQI report value and Index 2 as the Subband differential value, for example, as represented by B in FIG. 5.

With reference to the Wideband CQI table, the control unit 200 detects that the Wideband CQI is Index 1 and that the Diff reference value is "3", since the CQI report value is "1". Then, the control unit 200 detects that the Subband CQI is "2" on the basis of the Subband CQI table and the Diff reference value "3", since the Subband differential value is Index 2. The control unit 200 thereby detects Index 1 as the Wideband CQI and "2" as the Subband CQI.

In the mobile communication system having the above-described configuration, the each of the mobile station and the base station stores the Wideband CQI table and the Subband CQI table. The mobile station transmits to the base station the CQI report value indicating the Wideband CQI, and the index (Index S) indicating the differential value of the Subband CQI and the Diff reference value based on the CQI report value, on the basis of these tables. When the Wideband CQI report value is in the range close to the upper limit or lower limit of the Wideband CQI table, the Diff reference value becomes variable to prevent the index expression amount from being damaged. Therefore, according to the mobile communication system, the bit strings required for the transmission of the Diff value can be effectively used even if the CQI report value indicating the Wideband CQI is the value close to the upper limit or the lower limit.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

For example, in the above-described embodiment, the tables as shown in FIG. 4 are explained as the Wideband CQI table and the Subband CQI table preliminarily recorded by the control unit 100 and the control unit 200, but are not limited thereto. They may be the Wideband CQI table and the Subband CQI table as shown in, for example, FIG. 7.

Figure 7:
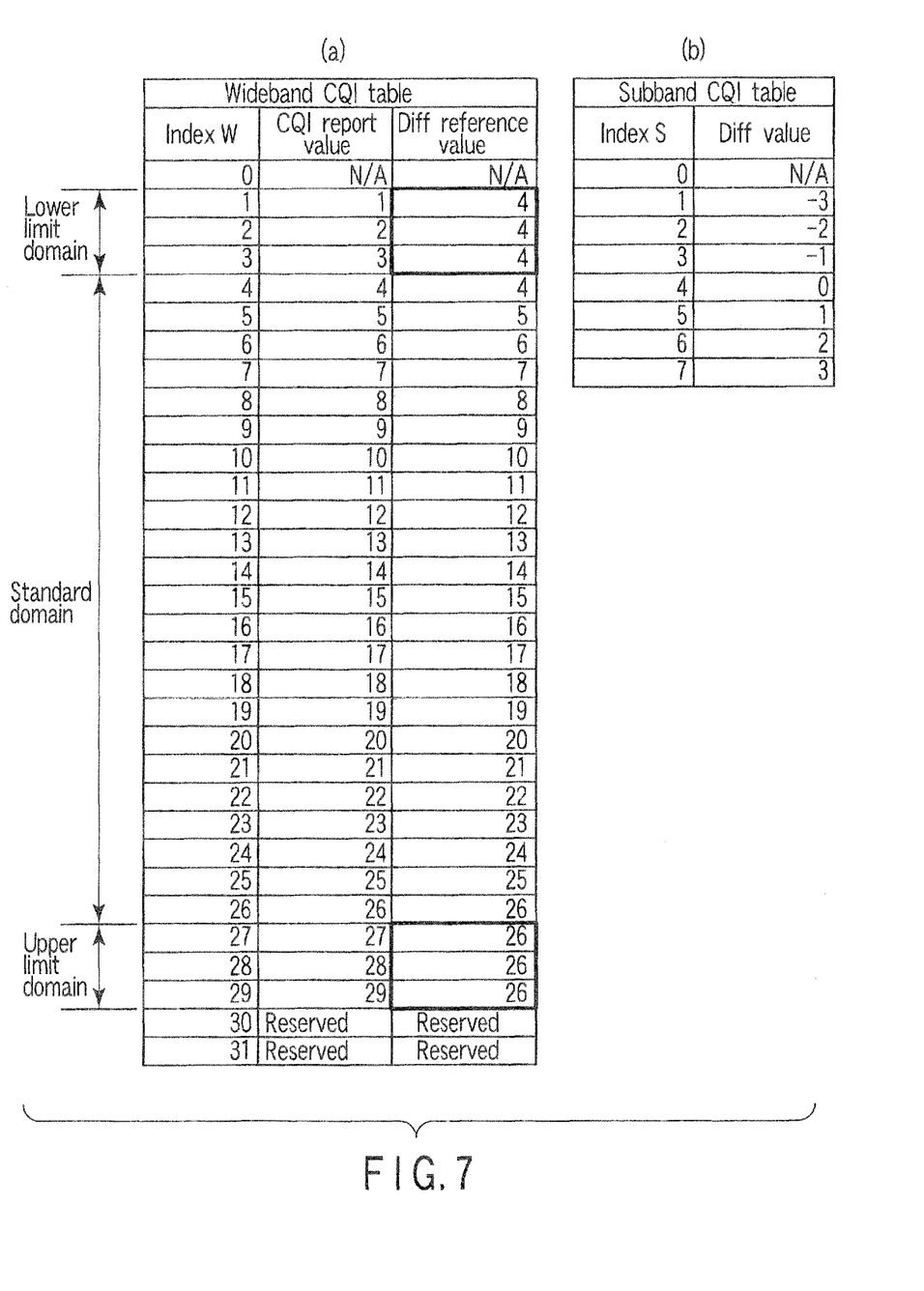
FIG. 7 shows CQI tables used in the mobile communication system according to the present invention.

In other words, "N/A (not applicable, or not available)" is set on the Wideband CQI table and the Subband CQI table or a remainder is left in a notation range of 5 bit on the Wideband CQI table. In this example, N/A and 1-29, i.e. 30 types of "Index" are defined as the CQI values on the Wideband CQI table, and Index 30, 31 is reserved for future system expansion. Even if these tables are used, the bit string required for the transmission of the Diff value can be effectively used irrespective of the CQI report value indicating the Wideband CQI.

In addition, number k of Subbands are handled as a single Wideband, and the control unit 100 transmits the CQI information on number j of Subbands having preferable reception quality, of the number k of Subbands. Therefore, the Subband CQI of the selected number j of Subbands may be higher as compared with the Wideband CQI.

Figure 8:
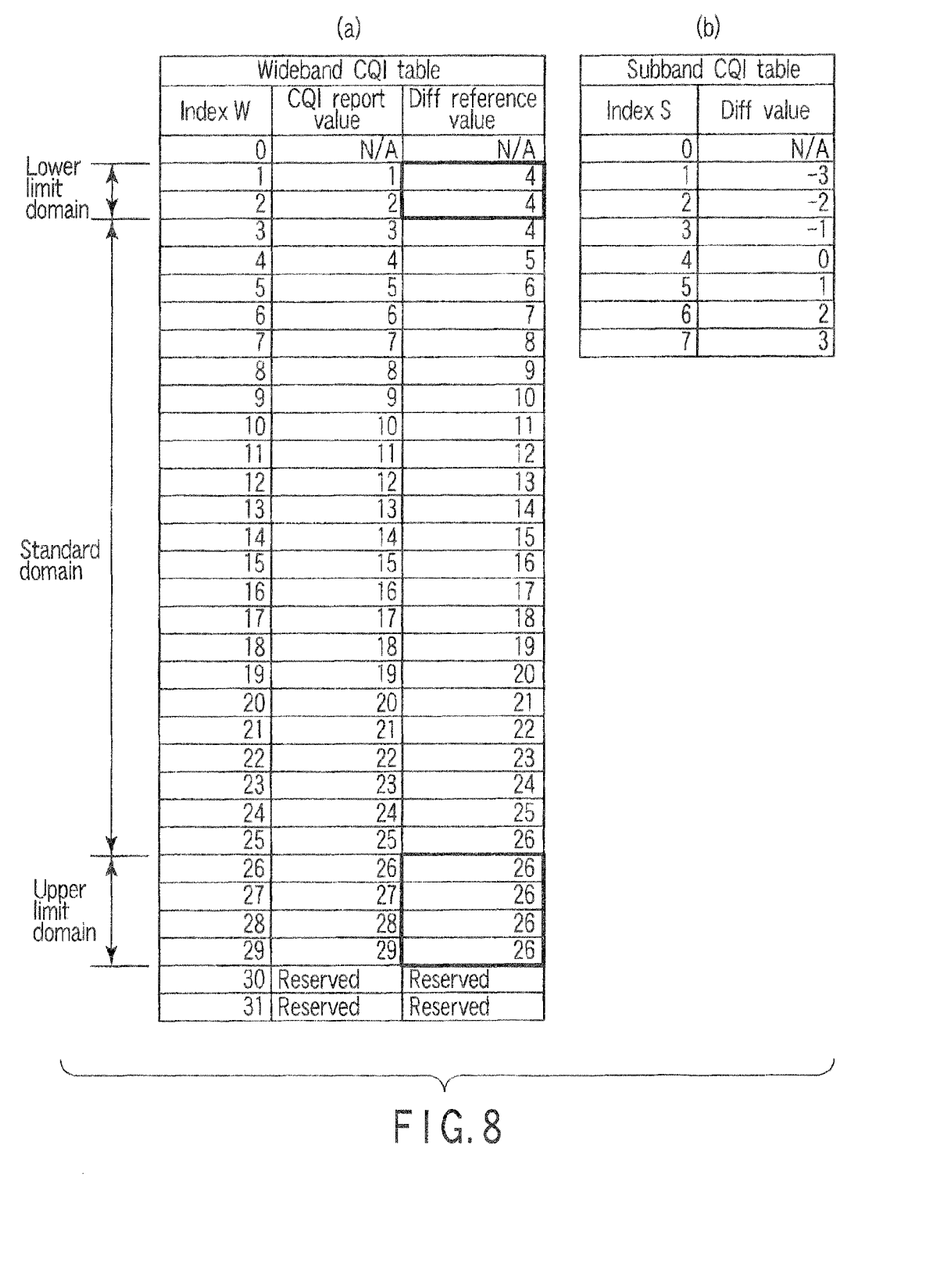
FIG. 8 shows CQI tables used in the mobile communication system according to the present invention.
Figure 9:
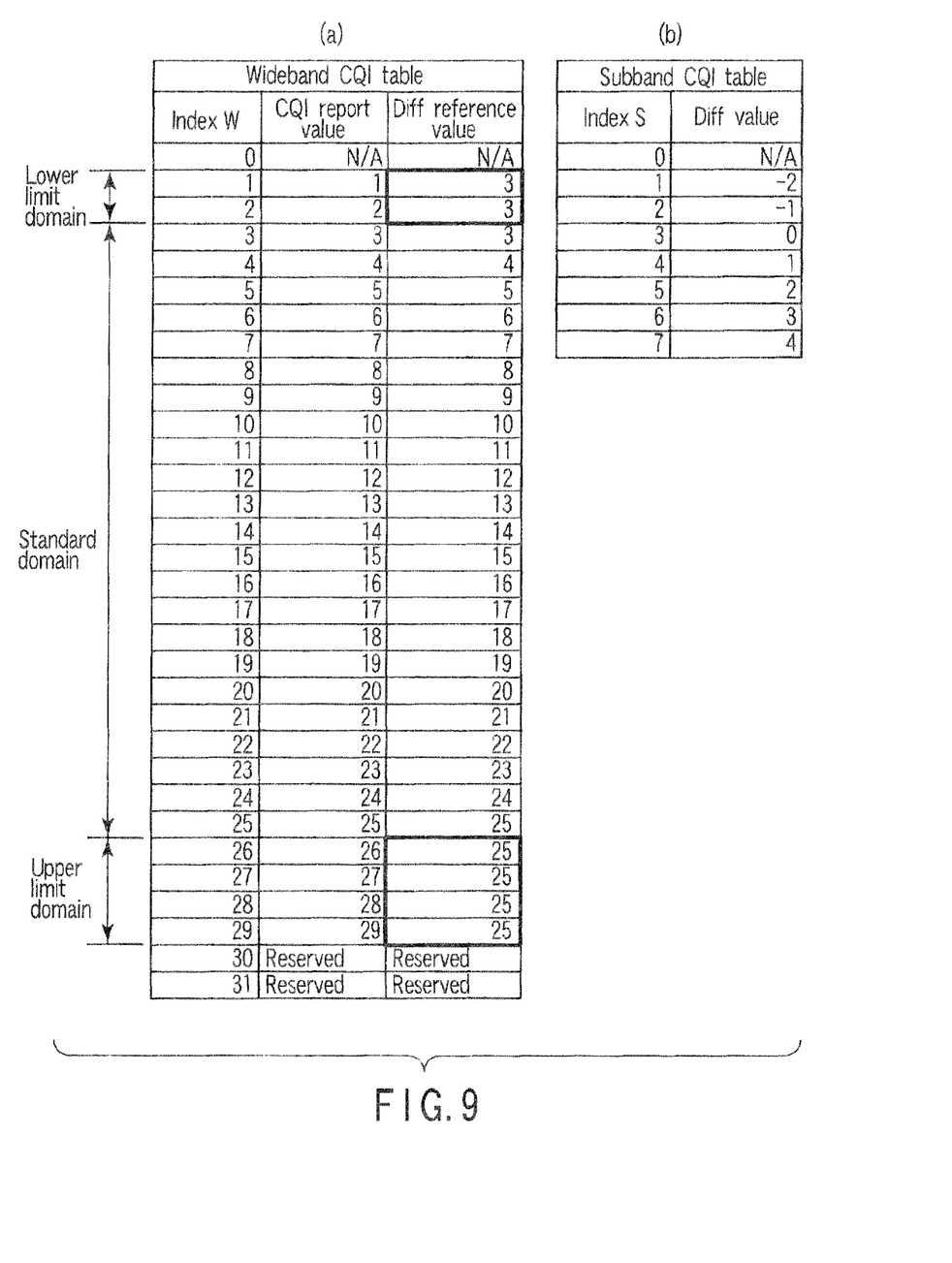
FIG. 9 shows CQI tables used in the mobile communication system according to the present invention.

For this reason, the CQI report value and the Diff reference value (except the upper limit domain and the lower limit domain) are not made to coincide (referential difference=0), as shown on the tables of FIG. 4 and FIG. 7, but the Wideband CQI table in which the Diff reference value is set to be relatively higher than the CQI report value (referential difference=1) as shown in FIG. 8 may be used. Otherwise, the expression domain of the Subband CQI table may be set to be higher in consideration of the relatively higher Subband CQI, as shown in FIG. 9. In this case, by setting it relatively higher, the Diff reference vales in the upper limit domain and the lower limit domain on the Wideband CQI table are adjusted ("4" to "3").

By the settings of the Wideband CQI table and the Subband CQI table, the base station can be more exactly notified of the Subband CQI.

Moreover, the Diff reference value is made variable to prevent the index expression amount from being damaged, in both the upper limit domain and the lower limit domain on the Wideband CQI table. However, the Diff reference value may be made variable to prevent the index expression amount from being damaged, in either of the domains.

The present invention can also be variously modified within a scope which does not depart from the gist of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile radio terminal establishing radio communications with a base station apparatus accommodated in a network, the mobile radio terminal comprising:
   a Wideband measuring unit which measures reception quality of a Wideband;
   a Subband measuring unit which measures reception quality of each of a plurality of Subbands included in the Wideband;
   a first determining unit which determines a Wideband report value within a preset first range, in accordance with the measurement result of the Wideband measuring unit;
   a second determining unit which determines a reference value having a preset first referential difference from the Wideband report value, and which determines a reference value having a second referential difference smaller than the first referential difference if the Wideband report value is a value in a preset upper limit domain;
   a third determining unit which determines an index value corresponding to a difference between the referential value and the Subband reception quality, within a preset second range; and
   a transmitting unit which transmits the Wideband report value and the index value to the base station apparatus.

2. The mobile radio terminal according to claim 1, wherein the second determining unit sets the first referential difference to be a positive value.

3. The mobile radio terminal according to claim 1, wherein the third determining unit sets number of index values superior in reception quality to the referential value to be more than number of index values inferior in reception quality.

4. A mobile radio terminal establishing radio communications with a base station apparatus accommodated in a network, the mobile radio terminal comprising:
   a Wideband measuring unit which measures reception quality of a Wideband;
   a Subband measuring unit which measures reception quality of each of a plurality of Subbands included in the Wideband;
   a first determining unit which determines a Wideband report value within a preset first range, in accordance with the measurement result of the Wideband measuring unit;
   a second determining unit which determines a reference value having a preset first referential difference from the Wideband report value, and which determines a reference value having a second referential difference greater than the first referential difference if the Wideband report value is a value in a preset lower limit domain;
   a third determining unit which determines an index value corresponding to a difference between the referential value and the Subband reception quality, within a preset second range; and
   a transmitting unit which transmits the Wideband report value and the index value to the base station apparatus.

5. The mobile radio terminal according to claim 4, wherein if the Wideband report value is a value in a preset upper limit domain, the second determining unit determines a reference value having a third referential difference smaller than the first referential difference.

6. The mobile radio terminal according to claim 5, wherein the second determining unit sets number of Wideband report values falling within the upper limit domain to be more than number of Wideband report values falling within the lower limit domain.

7. The mobile radio terminal according to claim 4, wherein the second determining unit sets the first referential difference to be a positive value.

8. The mobile radio terminal according to claim 4, wherein the third determining unit sets number of index values superior in reception quality to the referential value to be more than number of index values inferior in reception quality.

9. A mobile communication system in which a base station apparatus accommodated in a network establishes radio communications with a mobile radio terminal, the mobile radio terminal comprising:
   a Wideband measuring unit which measures reception quality of a Wideband;
   a Subband measuring unit which measures reception quality of each of a plurality of Subbands included in the Wideband;
   a first determining unit which determines a Wideband report value within a preset first range, in accordance with the measurement result of the Wideband measuring unit;
   a second determining unit which determines a reference value having a preset first referential difference from the Wideband report value, and which determines a reference value having a greater second referential difference than the first referential difference if the Wideband report value is a value in a preset lower limit domain and determines a reference value having a second referential difference smaller than the first referential difference if the Wideband report value is a value in a preset upper limit domain;
   a third determining unit which determines an index value corresponding to a difference between the referential value and the Subband reception quality, within a preset second range; and
   a transmitting unit which transmits the Wideband report value and the index value to the base station apparatus,
   the base station apparatus comprising:
   a receiving unit which receives the Wideband report value and the index value from the mobile radio terminal;
   a first detecting unit which detects the reception quality of the Wideband in accordance with the Wideband report value;
   a second detecting unit which detects the reception quality of the Subbands, in accordance with the Wideband report value and the index value; and
   a determining unit which determines a modulation scheme of a transmission signal for the mobile radio terminal, in accordance with the reception quality detected by the first detecting unit and the reception quality detected by the second detecting unit.

10. A mobile radio terminal establishing radio communications with a base station apparatus accommodated in a network, the mobile radio terminal comprising:
    a Wideband measuring unit which measures reception quality of a Wideband;

a Subband measuring unit which measures reception quality of each of a plurality of Subbands included in the Wideband;

a determining unit which determines a Wideband report value within a preset first range, in accordance with the measurement result of the Wideband measuring unit;

a first memory unit which stores a Wideband quality table associating a reference value having a preset first referential difference with the Wideband report value in a preset standard domain, and associating a reference value having a second referential difference smaller than the first referential difference with the Wideband report value of an upper limit domain greater than the standard domain;

a second memory unit which stores a Subband quality table associating a difference between the reference value and the Subband reception quality, with an index value in a preset second range;

a detecting unit which detects a referential value associated with the Wideband report value by referring to the Wideband quality table, and detects an index value associated with a difference between the reference value and the Subband reception quality; and a transmitting unit which transmits the index value detected by the detecting unit and the Wideband report value to the base station apparatus.

11. The mobile radio terminal according to claim 10, wherein the first memory unit stores a Wideband quality table setting the first referential difference to be a positive value.

12. The mobile radio terminal according to claim 10, wherein the second memory unit stores a Subband quality table setting number of index values superior in reception quality to the referential value to be more than number of index values inferior in reception quality.

13. A mobile radio terminal establishing radio communications with a base station apparatus accommodated in a network, the mobile radio terminal comprising:

a Wideband measuring unit which measures reception quality of a Wideband;

a Subband measuring unit which measures reception quality of each of a plurality of Subbands included in the Wideband;

a determining unit which determines a Wideband report value within a preset first range, in accordance with the measurement result of the Wideband measuring unit;

a first memory unit which stores a Wideband quality table associating a reference value having a preset first referential difference with the Wideband report value in a preset standard domain, and associating a reference value having a second referential difference greater than the first referential difference with the Wideband report value of a lower limit domain smaller than the standard domain;

a second memory unit which stores a Subband quality table associating a difference between the reference value and the Subband reception quality, with an index value in a preset second range;

a detecting unit which detects a referential value associated with the Wideband report value by referring to the Wideband quality table, and detects an index value associated with a difference between the reference value and the Subband reception quality; and a transmitting unit which transmits the index value detected by the detecting unit and the Wideband report value to the base station apparatus.

14. The mobile radio terminal according to claim 13, wherein the first memory unit stores a Wideband quality table associating the reference value having the preset first referential difference with the Wideband report value in the preset standard domain, associating a reference value having the second referential difference greater than the first referential difference with the Wideband report value of the lower limit domain smaller than the standard domain, and associating a reference value having a third referential difference smaller than the first referential difference with the Wideband report value of the upper limit domain greater than the standard domain.

15. The mobile radio terminal according to claim 14, wherein the first memory unit stores a Wideband quality table setting number of Wideband report values falling within the upper limit domain to be more than number of Wideband report values falling within the lower limit domain.

16. The mobile radio terminal according to claim 13, wherein the first memory unit stores a Wideband quality table setting the first referential difference to be a positive value.

17. The mobile radio terminal according to claim 13, wherein the second memory unit stores a Subband quality table setting number of index values superior in reception quality to the referential value to be more than number of index values inferior in reception quality.

18. A mobile communication system in which a base station apparatus accommodated in a network establishes radio communications with a mobile radio terminal, the mobile radio terminal comprising:

a Wideband measuring unit which measures reception quality of a Wideband;

a Subband measuring unit which measures reception quality of each of a plurality of Subbands included in the Wideband;

a determining unit which determines a Wideband report value within a preset first range, in accordance with the measurement result of the Wideband measuring unit;

a first memory unit which stores a Wideband quality table associating a reference value having a preset first referential difference with the Wideband report value in a preset standard domain, associating a reference value having a second referential difference greater than the first referential difference with the Wideband report value of a lower limit domain smaller than the standard domain, and associating a reference value having a third referential difference smaller than the first referential difference with the Wideband report value in an upper limit domain greater than the standard domain;

a second memory unit which stores a Subband quality table associating a difference between the reference value and the Subband reception quality, with an index value thereof;

a first detecting unit which detects a referential value associated with the Wideband report value by referring to the Wideband quality table, and detects an index value associated with the difference between the reference value and the Subband reception quality from the Subband quality table; and a transmitting unit which transmits the index value detected by the first detecting unit and the Wideband report value to the base station apparatus, the base station apparatus comprising:

a receiving unit which receives the Wideband report value and the index value from the mobile radio terminal;

a second detecting unit which detects the reception quality of the Wideband in accordance with the Wideband report value;

a third detecting unit which detects the reception quality of the Subbands, in accordance with the Wideband report value and the index value; and a determining unit which determines a modulation scheme of a transmission signal for the mobile radio terminal, in accordance with the reception quality detected by the second detecting unit and the reception quality detected by the third detecting unit.

19. A base station apparatus establishing radio communications with a mobile radio terminal, comprising:

a receiving unit which receives a Wideband report value indicating Wideband reception quality, and an index value indicating reception quality of a plurality of Subbands included in the Wideband as a relative value to the Wideband report value, from the mobile radio terminal;

a first detecting unit which detects the Wideband reception quality in a preset first range, in accordance with the Wideband report value;

a first determining unit which determines the Wideband report value and a reference value having a preset first referential difference, and determines a reference value having a second referential difference smaller than the first referential difference if the Wideband report value is a value of a preset upper limit domain;

a second detecting unit which detects the Subband reception quality in a preset second range, in accordance with the reference value and the index value; and a second determining unit which determines a modulation scheme of a transmission signal for the mobile radio terminal, in accordance with the reception quality detected by the first detecting unit and the reception quality detected by the second detecting unit.

20. The base station apparatus according to claim 19, wherein the first determining unit sets the first referential difference to be a positive value.

21. The base station apparatus according to claim 19, wherein the second detecting unit sets number of index values superior in reception quality to the referential value to be more than number of index values inferior in reception quality.

22. A base station apparatus establishing radio communications with a mobile radio terminal, comprising:

a receiving unit which receives a Wideband report value indicating Wideband reception quality, and an index value indicating reception quality of a plurality of Subbands included in the Wideband as a relative value to the Wideband report value, from the mobile radio terminal;

a first detecting unit which detects the Wideband reception quality in a preset first range, in accordance with the Wideband report value;

a first determining unit which determines the Wideband report value and a reference value having a preset first referential difference, and determines a reference value having a second referential difference greater than the first referential difference if the Wideband report value is a value of a preset lower limit domain;

a second detecting unit which detects the Subband reception quality in a preset second range, in accordance with the reference value and the index value; and a second determining unit which determines a modulation scheme of a transmission signal for the mobile radio terminal, in accordance with the reception quality detected by the first detecting unit and the reception quality detected by the second detecting unit.

23. The base station apparatus according to claim 22, wherein the first determining unit determines the Wideband report value and the reference value having the preset first referential difference, and determines a reference value having a second referential difference greater than the first referential difference if the Wideband report value is a value of a preset lower limit domain and determines a reference value having a third referential difference smaller than the first referential difference if the Wideband report value is a value of a preset upper limit domain.

24. The base station apparatus according to claim 23, wherein the first determining unit sets number of Wideband report values falling within the upper limit domain to be more than number of Wideband report values falling within the lower limit domain.

25. The base station apparatus according to claim 22, wherein the first determining unit sets the first referential difference to be a positive value.

26. The base station apparatus according to claim 22, wherein the second detecting unit sets number of index values superior in reception quality to the referential value to be more than number of index values inferior in reception quality.

* * * * *